Dec. 6, 1960   G. S. BLACK ET AL   2,963,696
ELECTROMECHANICAL RESOLVER
Filed Sept. 15, 1955   4 Sheets-Sheet 1

INVENTORS
GEORGE S. BLACK AND
ROBERT H. PETERSON
BY
J. C. Whittaker
ATTORNEY

Dec. 6, 1960  G. S. BLACK ET AL  2,963,696
ELECTROMECHANICAL RESOLVER
Filed Sept. 15, 1955  4 Sheets-Sheet 2

INVENTORS
GEORGE S. BLACK AND
ROBERT H. PETERSON
BY J. C. Whittaker
ATTORNEY

Dec. 6, 1960  G. S. BLACK ET AL  2,963,696
ELECTROMECHANICAL RESOLVER
Filed Sept. 15, 1955  4 Sheets-Sheet 3

INVENTORS
GEORGE S. BLACK AND
ROBERT H. PETERSON
BY J. C. Whittaker
ATTORNEY

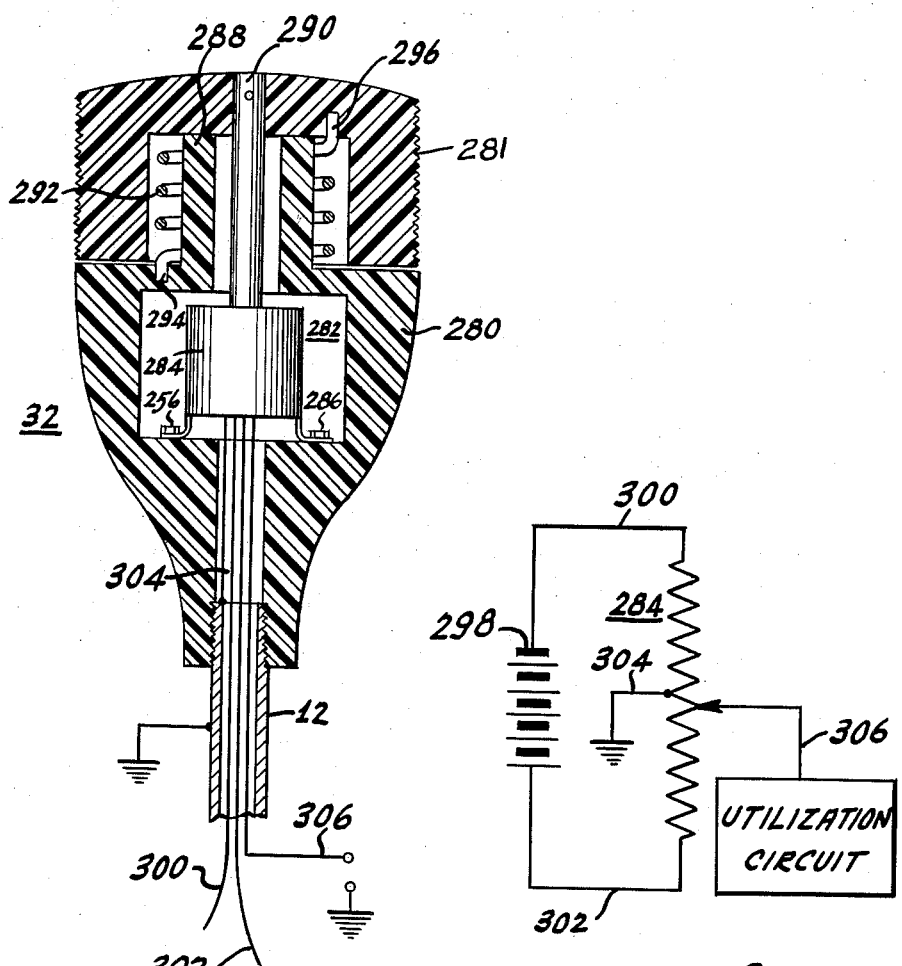

United States Patent Office 2,963,696
Patented Dec. 6, 1960

2,963,696

ELECTROMECHANICAL RESOLVER

George S. Black, Pitman, and Robert H. Peterson, Woodbury Heights, N.J., assignors to Radio Corporation of America, a corporation of Delaware Filed Sept. 15, 1955, Ser. No. 534,502

18 Claims. (Cl. 340—324)

The present invention relates to an improved mechanical movement of the so-called "joystick" type—an arrangement for translating the movement of one member into corresponding movement of one or more other members. The movements of these other members may in turn be converted to a voltage or voltages having parameters indicative of the extent and direction of the movement of the one member.

A brief reference to one specific use of joystick controls will aid in explaining some of the important features of the present invention. Automatic tracking radar systems provide information in polar or rectangular form as to the position of one or more targets (aircraft, surface vessels or the like) in a given volume of space. Polar informaiton is in the form R sin $\theta$, where R designates the slant range of the target, and $\theta$ its angle of displacement from a reference direction. Rectangular information is in the form X, Y, which designate the geographical coordinates of the target in a horizontal plane relative to the radar system. In both cases the information may be in the form of voltages. In both cases, for sake of simplicity, two dimensions only are discussed. The information provided by the radar system is usually displayed on the screen of a display device such as a cathode ray tube indicator or the like. The system also generates a marker (an intense spot on the screen of the display or an associated display) which may be deflected by appropriate voltages applied to the deflecting means of the display. The joystick control may be used in such an arrangement. Its output voltage, for example, may be adjusted to move the marker until the same is superimposed over or in the same relative position as the echo from a selected target. When this occurs, the output voltage of the joystick control is indicative of the spatial coordinates of the selected target and may be applied to automatic tracking circuits or the like for locking those circuits on the target.

The joystick control itself includes an extending shaft or control member. When the shaft is in its center position, the quantities R and $\theta$ or X and Y equal zero. Assume that the joystick control is of the type which generates voltages in R sin $\theta$ form. Assume also that the control is being employed to generate a voltage which tracks the position of a selected target, say an aircraft. If the aircraft is flying directly toward the radar system and passes over the radar system, the $\theta$ output of the joystick control must suddenly change from $\theta$ to $\theta+180°$ or $\theta-180°$. It has been found that such abrupt changes in "phase angle" tend to confuse the joystick control. The joystick control does not know whether to change its phase angle output in a clockwise or counter clockwise direction and, it has been found, tends to lock in the R=0, $\theta$=0 position.

Accordingly, it is an object of the present invention to provide an improved joystick control of the type described which includes means for overcoming the above difficulty.

It is another object of the invention to provide a mechanical movement which simultaneously translates the linear mechanical movement of one of its parts into corresponding equivalent rotational movement of a second of its parts and corresponding equivalent rectangular coordinate movemnets of third and fourth of its parts.

Yet another object of the present invention is to provide a joystick control of the type which simultaneously converts mechanical position information into an equivalent electrical alternating signal in the polar form R sin $\theta$, where R is a term of magnitude and $\theta$ one of phase, and equivalent electrical signals in the form X, Y, where X and Y are direct or alternating voltages having amplitudes indicative of the rectangular coordinates of said position.

Another object of the invention is to provide a joystick control in which equal force, per unit of travel, is required to move the control member regardless of the angle or extent of displacement of the member from its center position.

Another object of the invention is to provide a joystick control which converts mechanical input information into equivalent electrical signals (alternating or direct) in the form X, Y, Z, where X and Y are voltages having amplitudes indicative of the rectangular coordinates in one plane of the position of an object and Z is a voltage having an amplitude indicative of the velocity of the object, or, in other uses of the invention, of the coordinate of the object in a plane perpendicular to the one plane.

The invention includes a support and a control member movably mounted on the support. The control member is mechanically coupled to a pair of gear rack devices movable along mutually perpendicular axes. When the member is moved from its rest position the racks move the equivalent amounts along their respective axes. In other words, the vector sum of the movements of the two gear racks equals the linear extent of the movement of the control member. The gear racks may be coupled to potentiometers or the like in circuits for deriving from the gear rack movements corresponding direct voltages.

The control member is also coupled to a rotatable member which rotates in accordance with corresponding angular movement of the control member. A voltage in the form R sin $\theta$ may be derived from circuits coupled to this rotatable member and the two gear racks, where R and $\theta$ are indicative of the extent and angle of the movement of the control member. To prevent the control member from locking as it passes through X=0, $\theta$=0, the rotatable member is automatically moved through an angle on the order of 90°–180° whenever the control member approaches the R=0, $\theta$=0 position. Thus, the rotatable member is already started rotating in a given direction toward $\theta \pm 180°$ when the control member reaches its R=0, $\theta$=0 position, and the system does not lock.

The coupling of the control member to the rotatable member is through a motor and a control circuit for the motor. Movement of the control member actuates switches in the motor control circuit which cause the motor to rotate in a direction which is dependent on the direction of movement of the control member. The motor drives the rotatable member. This type of coupling is advantageous in that the force on the control member, per unit of travel, required to turn the rotatable member is the same regardless of the angle or extent of displacement of the control member from its rest position.

In one embodiment of the invention means are provided for obtaining an electrical output representative of three coordinates of a position, or of two coordinates of the position of an object and a third coordinate indicative of the velocity of movement of the object. This may include a rotatable means on the control member and means for translating the angle through which it is rotated into a voltage having a parameter indicative of the magnitude of the angle.

The invention will be described in greater detail with reference to the accompanying drawing in which similar reference characters are applied to similar elements, and in which:

Figure 5 is a cross-sectional view of a portion of a second embodiment of the present invention; and Figure 6 is a diagram of the electrical circuit of Fig. 5.

Figure 1:
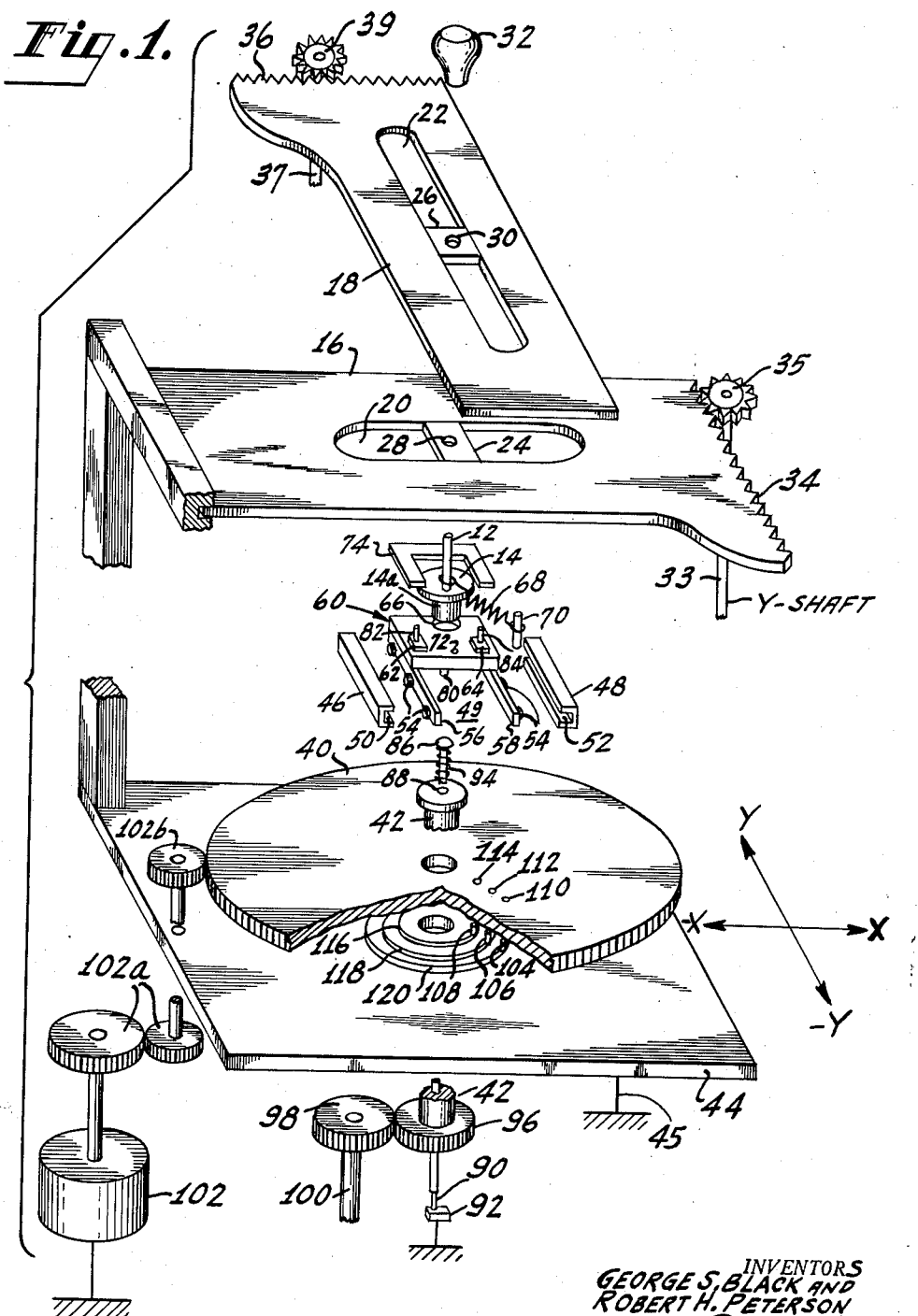
Figure 1 is an exploded, perspective view of one embodiment of the invention.

Figure 1 is a view of a preferred embodiment of the invention without its supporting framework. Shaft 12 is fixed at one end to the peripheral portion of rotatable disk 14. The latter is fixed to the end of shaft 14a. A pair of mutually perpendicular elongated rectangular plates 16 and 18 formed with mutually perpendicular longitudinal slots 20 and 22 respectively, are located above rotatable disk 14. Members 24 and 26 engage the opposite long walls of the respective slots and are movable along the lengths of the slots. These members are formed with apertures 28 and 30, respectively, through which shaft 12 extends. A knob 32 is fixed to the free end of shaft 12.

One edge of each plate (edge 34 of plate 16 and edge 36 of plate 18) is formed with gear teeth along its length. The teeth in each plate extend parallel to the axis of the longitudinal slot in the other plate. Pinion 35 engages the gear teeth of plate 16 and pinion 39 engages the gear teeth of plate 18. It can now be seen that linear movement of knob 32 is translated into equivalent, mutually perpendicular movements of plates 16 and 18. The latter movements can be translated by pinions 35 and 39, respectively, shafts 33 and 37 to which they are attached, and circuits coupled to the shafts into voltages as will be explained more fully below. The instantaneous values of the voltages are indicative of the X and Y positional coordinates of the knob 32.

A turntable 40 disposed beneath the positioning member 12, is rotatably mounted on shaft 42 which is supported by table 44. The table 44 is fixed to the supporting framework of the entire assembly as shown schematically by symbol 45. A pair of parallel spaced rails 46 and 48 are fastened to the turntable 40 by bolts or any other suitable means. The rails are formed with a pair of longitudinal slots 50 and 52 respectively, positioned facing one another. Carriage 49 comprises a pair of spaced parallel bars 56 and 58 and a platform 60 fixed to the bar. The entire carriage is mounted on rollers 54. The rollers rotate on axles fixed to the bars 56 and 58 and ride in the slots 50 and 52. A pair of switches 62 and 64 are mounted on opposite sides of the platform 60.

Shaft 14a of disk 14 is rotatably mounted in an aperture 66 in platform 60. The disk is prevented from rotating through more than a small angle in either direction from its rest or center position by detent pins (not shown) fixed to platform 60 and engageable with corresponding slots in the disk. Disk 14 is biased to its center position by coil spring 68 fastened at one end to shaft 12 and at the other end to pin 70. The latter fits into an aperture 72 in platform 60 and thus secures the other end of the spring to the platform.

If one assumes that the axis of slot 20 is an arbitrary X axis and the axis of slot 22 a corresponding Y axis, when shaft 12 is in its center position, it is at the origin of this set of axes. At this time, disk 14 is also in its center position and pin 70 is on the —Y axis. The X and Y output voltages from the system are equal to zero.

A contact member 74, comprising a flat, U-shaped member, is fixed at its base by bolts or any other suitable means (not shown) to disk 14 and rotates when the disk does. When the positioning shaft 12 is moved in a direction such that disk 14 rotates counter-clockwise, the left arm (as viewed in the figure) of the U-shaped member 74 engages handle 82 of left switch 62, thereby closing its contacts. Release of the pressure on the handle 82 opens the contacts. A similar action occurs in connection with the right switch 64 when the positioning element 12 is moved in the opposite direction. Thus disk 14 is rotated clockwise and switch 64 closed.

The spacing between the free ends of the arms of U-shaped member 74 and the handles 82 and 84 of the microswitches 62 and 64 when disk 14 is in its center position should be as small as possible. This is to reduce to a minimum errors between the positions of shaft 12 and turntable 40. A typical spacing is .001 or .002 inch and the extent of displacement of the switch handles from "open" to "closed" positions may also be small, for example, less than .0005 inch. Disk 14 is prevented from rotating more than a small distance on either side of its center position in order to avoid excessive pressure on the switch handles.

The arrangement which prevents the control shaft 12 from locking in its center position includes a rounded spur 80 fixed to and projecting from the bottom of platform 60. It is located at a point immediately below the axis of the shaft 12 when disk 14 is in its center position. When shaft 12 is in or close to its center position (at the origin of the arbitrary X—Y axes), spur 80 contacts plunger 86. The latter extends through aperture 88 in the center of the turntable shaft 42 and makes contact at its lower end with button 90 of center switch 92.

As will be explained more fully below the center switch is in a motor control circuit and when it is energized, a motor turns the turntable about 90°–180° in a given direction. This permits the control member to move through or very close to its center position without locking.

When the control member leaves its center position, spur 80 becomes disengaged from plunger 86, compression spring 94 raises the plunger and the contacts of center switch 92 open.

A pinion 96 is fixed to turntable shaft 42 to permit the rotation of the turntable 40 to be measured. Gear 96 may be coupled via gear 98 and shaft 100 to the rotor of a rotary transformer. Other suitable means for measuring azimuthal rotation may be employed instead and the coupling may be directly to the turntable shaft 42 rather than through a gearing arrangement.

Turntable 40 is rotated by a motor 102 which is coupled to the turntable through gears 102a and 102b. The motor may be an A.C. or D.C. motor and details of one will be given later.

Leads to the left and right switches 62 and 64 may be brought down to brushes 104, 106, 108 which extend downward through apertures 110, 112, 114, respectively, and rotate with the turntable 40. The brushes 104, 106, 108 make sliding contact with slip rings 120, 118, 116, respectively, mounted on the table 44. Wiring connections to the switches 62, 64, 92 and to the motor 102 are not shown in Fig. 1.

Figure 2:
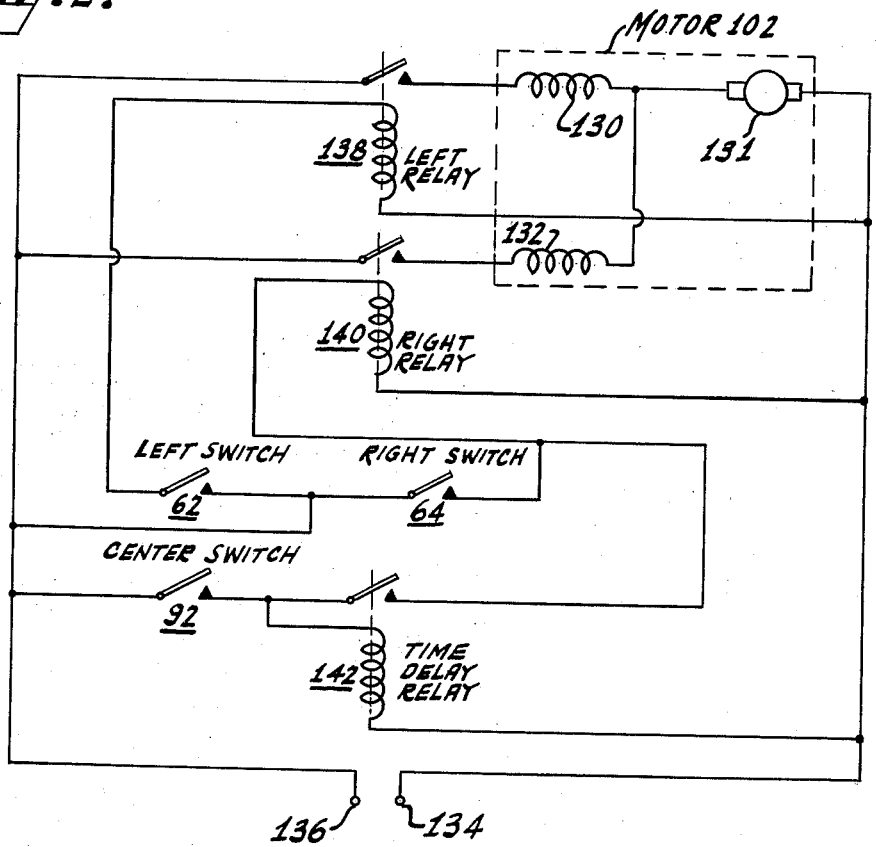
Figure 2 is a schematic circuit diagram of the control circuit for the turntable motor.

Figure 2 illustrates how the switches control the rotation of the motor 102. One terminal of the motor armature winding 131 is connected to alternating current supply terminal 134 and the other terminal of the armature is connected in common to an end of field windings 130 and 132. If the left switch 62 is closed, alternating current flows through the left relay 138, closing its contacts, energizing field winding 130 and rotating the motor in one direction. If the right switch 64 is closed, alternating current flows through the right relay 140, closing its contacts and energizing field winding 132, initiating motor rotation in the opposite direction.

If the center switch 92 is closed, alternating current flows through time relay 142. The relay is of the type which instantaneously closes and then opens after a predetermined interval of time. When the relay closes, motor 102 rotates in the same direction as it would if the right switch 64 were closed. The time delay relay 142, which may be a thermal element type, is adjusted to open automatically after the motor 102 has had sufficient time to rotate the turntable 40 between 90° and 180°. The lower (90°) figure is not critical but the time delay should not be set to remain shut longer than the time required for turntable 40 to rotate 180°.

Figure 3:
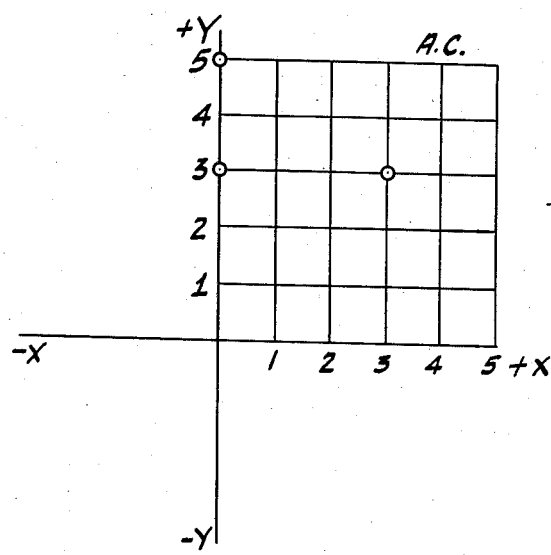
Figure 3 is a diagrammatic representation of several positions of the positioning member with respect to a set of X—Y coordinate axes.

Referring to Figs. 3 and 1, assume that shaft 12 is at the position 0, 3 of the arbitrary X, Y axes previously discussed, and that it is desired to move the shaft to position 0, 5. Since rails 46 and 48 are parallel to the direction in which the shaft 12 and knob 32 is to be moved, no contact with either the left or right switch 62 or 64 is made, and the positioning shaft 12 simply moves in the +Y direction. This moves member 26 along longitudinal slot 22 in the +Y direction, and plate 16 in the +Y direction. Movement of plate 16 causes rotation of pinion gear 35 and its shaft 33. However, if the operator desires to move the knob 32 from its (0, 3) position to a (3, 3) position (clockwise), for example, an angular component of force is present. This angular component of force rotates disk 14 counter-clockwise, as viewed from the top, thereby effecting contact between the left arm of the U-shaped member 74 and handle 82 of the left switch 62. The contacts of the left switch 62 are closed and the motor 102 then rotates the turntable 40 in a clockwise direction (as viewed from above). This last movement tends to break the contact between the arm of member 74 and handle 82 by attempting to move the handle away from the arm. However, continued pressure on the knob 32 by the operator maintains contact between the contact member 74 and the handle 82 until the turntable 40 has rotated 45° and the rails 46 and 48 are at an angle of 45° to the X-axis. At that time, the angular component of force disappears and only a component of force along the X-axis remains. The absence of an angular component of force permits the turntable to move switch handle 82 away from the left arm of member 74 and the switch opens. When the switch opens, the turntable stops. During rotation of the turntable, member 12 moves along the X-axis, member 24 moves to the right in the slot 20 and plate 18 also moves to the right, thereby causing rotation of the pinion gear 39 and its shaft 37.

It may be desired to move the knob 32 on a straight line through the origin of the axes, e.g. from (0, 3) to (0, −3). In such case, when the positioning member 12 and the projecting spur 80 are at the origin, the latter depresses plunger 86. This closes the contacts of the center switch 92, rotating the turntable 40 in a clockwise direction 90° or so. By reason of this rotation, pressure on the positioning member 12 along the Y-axis now produces an angular component of force and maintains rotation of the turntable 40 until it has completed a rotation of 180°, whereupon the rails 46 and 48 are again parallel to the Y-axis and movement of the positioning member 12 along the −Y axis may continue to position (0, −3). The reason a 180° rotation of the turntable 40 is necessary has been mentioned previously.

Figure 4:
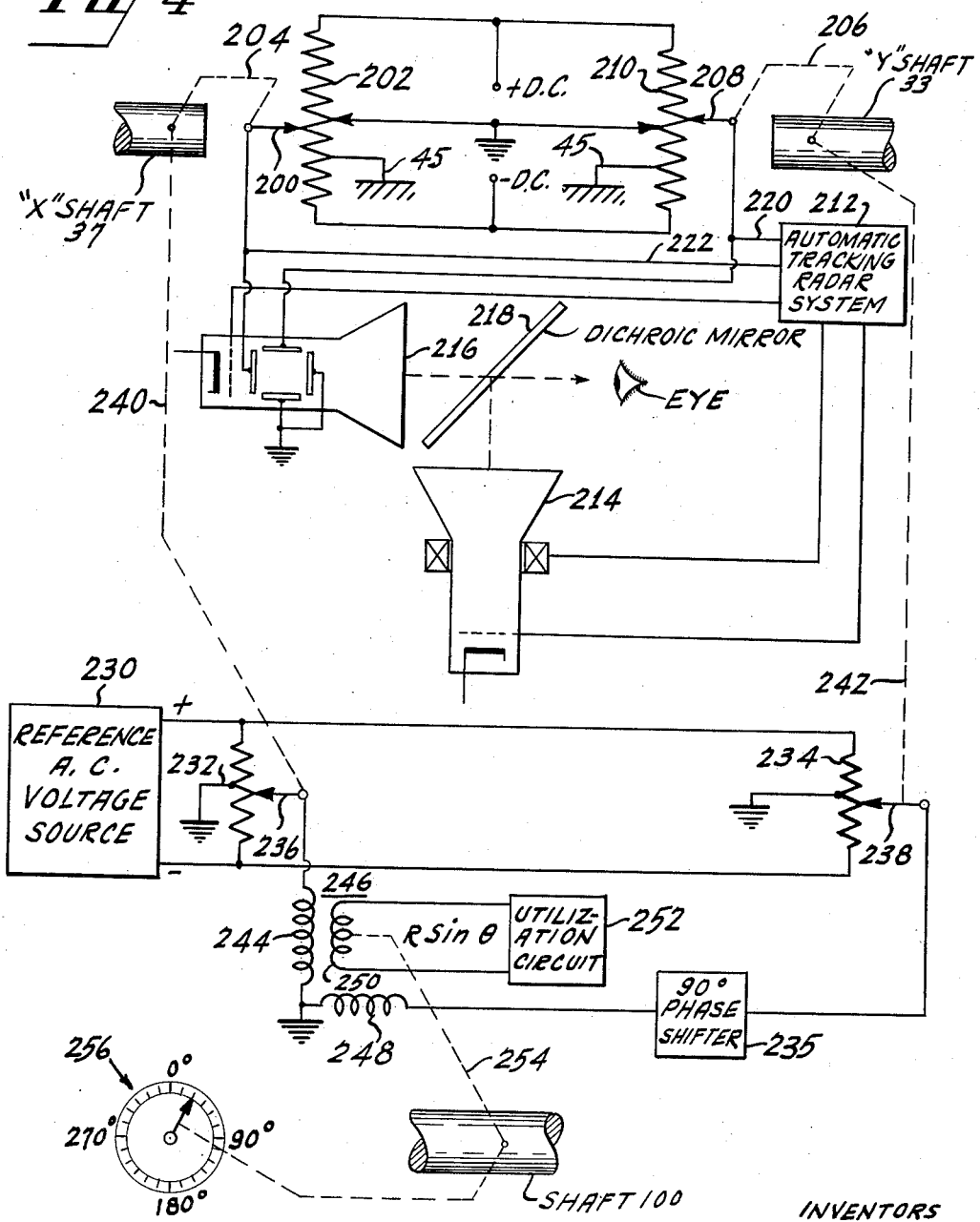
Figure 4 is a schematic circuit diagram of typical circuits for converting the mechanical output of the joystick control into electrical signals.

Figure 4 shows in brief some forms of circuits which may be used to derive from the mechanical movement of shafts 33, 37, and 100 (Fig. 1) electrical signals in cartesian coordinate form and/or polar coordinate form. Shaft 37 is mechanically coupled to the wiper 200 of potentiometer 202. This connection is shown schematically by the dashed line 204. In a similar manner Y shaft 33 is mechanically coupled by connection 206 to wiper 208 of potentiometer 210. The potentiometers are preferably fixed to the supporting assembly of the entire joystick control, indicated schematically by symbols 45. It might be mentioned parenthetically here that this type of construction is much preferred to at least some prior art arrangement employing gimbals. In the latter, at least one of the potentiometers must "float" and this makes the arrangement more complex from a mechanical engineering standpoint.

Potentiometers 202 and 210 are both grounded at their center and both supplied with a direct voltage applied across their respective ends. It can now be seen that when knob 32 of shaft 12 (Fig. 1) is in its center position, that is, at the origin of the X and Y axes, wipers 200 and 208 are positioned at the ground potential point. Thus, the output voltages of the potentiometer are $X=0$, $Y=0$. When knob 32 is displaced from its center position, shaft 37 and/or shaft 33 rotate whereby wipers 200 and/or 208 are moved from their 0 voltage positions to positions indicative of the displacement of the knob in the X and Y directions.

The X and Y direct voltages may be employed to deflect the cathode ray beam of an indicator in an automatic tracking radar system such as described more fully in application Serial No. 479,151, titled Target Designation Device for Automatic Tracking While Scan, filed December 31, 1954, in the names of F. D. Covely and L. E. Haining. The system, shown as a single block 212 includes a cathode ray tube indicator 214 for displaying targets in a P.P.I. (plan position indication) display. A second cathode ray tube indicator 216 has applied to the control grid thereof marker pulses which intensity modulate the cathode ray beam. Deflection circuits in the automatic tracking radar system maintain the beam of cathode ray tube 216 normally centered on the screen of the indicator.

A dichroic mirror 218 is positioned to transmit light from the screen of indicator 216 to the eye and reflect light from the screen of indicator 214 to the eye. An image on the screen of indicator 216 appears in one color and an image on the screen of indicator 214 appears in another color. When an image from one screen appears to the eye superimposed over the image from the other screen, it appears in a third color. If it is desired to track a selected target on the screen of cathode ray tube indicator 214, knob 32 (Fig. 1) is moved until the X and Y deflecting voltages from potentiometers 202 and 210 deflect the intense mark on the screen of 216 to a position such that it is superimposed over the selected target. The X and Y voltages are also applied over leads 220 and 222 through switches in the automatic tracking radar system to store circuits in said system. The system thereafter takes over and automatically continues to track the target producing the selected echo.

As mentioned in the introductory portion to this application, the system of the present invention may also be employed to derive a voltage in the form $R \sin \theta$, and this may be done simultaneously with the derivation of the rectangular coordinate analog voltages. A reference alternating current voltage source 230 applies its output across potentiometers 232 and 234. The center taps of the potentiometers are grounded. The wipers 236 and 238 of potentiometers are mechanically coupled by connections 240 and 242, respectively, to the X and Y shafts 37 and 33, respectively. Potentiometer 232 applies its output to stator coil 244 of two-phase resolver 246. The second potentiometer 234 applies its output through a 90° phase shifter 235 to the other stator winding 248 of the resolver. The rotor 250 of the resolver is mechanically connected by a connection 254 to shaft 100 (see Fig. 1). Rotor 250 is initially adjusted so that when knob 32 and shaft 12 are positioned at their center position (the origin of the X and Y axes), the output voltage of resolver is zero.

From the foregoing it can be seen that the circuit described translates the position of knob 32 and shaft 12 into a voltage in polar form $R \sin \theta$, R designating the extent of the displacement of the knob from its center position, and the $\theta$ indicating the angle of said displacement. This voltage may be applied to utilization circuit 252 such as an amplifier and servo motor connected to a load such as an antenna gun or the like.

As also shown in Figure 4, shaft 100 may be directly mechanically coupled to an indicator dial 256 for mechanically indicating the angle of displacement of knob 32 from its center position.

Figure 5 illustrates a portion of a second embodiment of the present invention. Knob 32 is analagous to the like numbered knob in the arrangement of Fig. 1 and shaft 12 is also analagous to the same numbered shaft of Fig. 1. Although not shown in Fig. 5, shaft 12 is connected to the entire assembly shown in detail in Fig. 1.

Rather than being solid as in Fig. 1, knob 32 is enlarged and formed into separate section 280, 281, respectively. Section 280 is fixedly mounted on shaft 12 and formed with a hollowed out portion 282. Potentiometer 284 is located in the hollowed out portion and secured to the lower knob section by means of bolts 286 or the like. The top section 281 of the knob is rotatable about constricted portion 288 of the lower knob section. Potentiometer shaft 290 is fixed to upper section 282 and rotates when the latter is rotated. Coil spring 292 is circumferentially arranged around the constricted portion 288 of the lower section of the knob and is fixed at one end 294 to said lower section and to the other end 296 to the upper section 282. Shaft 290 is connected to the wiper of the potentiometer. The function of bias spring 292 is to return the upper section of the knob and the potentiometer wiper to their center position when there is no twisting force (torque) applied to turn the upper section of the knob.

A brief reference to Fig. 6 will help to explain the electrical circuit of the arrangement of Fig. 5. A source of direct voltage 298 is connected across the opposite ends of potentiometer 284 via leads 300 and 302. The center tap of the potentiometer is grounded via lead 304, shown in Fig. 5 as directly connected to shaft 12. The output of the potentiometer is available at lead 306 which is connected to wiper 308.

This third voltage output of the potentiometer has a number of important applications. In tracking radar systems, for example, it is sometimes desirable to supply information to automatic tracking circuits to indicate of the velocity of a target being tracked. This may be done with the present arrangement and, for example, a circuit similar in some respects to the one shown at the top portion of Fig. 4. The joystick is first moved to a position such that a simulated echo on the screen of indicator 216 appears superimposed over an echo from targets of interest appearing on the screen of indicator 214. The upper section 282 of knob 32 is rotated an amount proportional to the velocity of the target being tracked. Potentiometers 202 and 210 (Fig. 4) are then disconnected from indicator 216 and automatic tracking circuits, not shown, connected to the deflecting plates of the indicator. These move the simulated echo at a velocity proportional to the amplitude of the direct voltage output at lead 306 (see Fig. 5). If the velocity information is accurate, the simulated echo will continue to remain superimposed over the real echo. On the other hand, if the information is inaccurate, one of the echoes will lag the other. In such cases it is necessary again to manually superimpose the simulated echo over the real one and to readjust the velocity information by twisting knob 282 to a new value.

Another use of the arrangement of Figs. 5 and 6 is to supply information relative to the third coordinate of a target being tracked. The X and Y outputs of the arrangement of Fig. 1 may be indicative of the coordinates in a horizontal plane of a target being tracked. Twisting knob 282 will give a direct voltage output which may be made proportional to the height coordinate of the target being tracked.

In the arrangement shown in Fig. 5 a return spring is provided for returning the wiper to its center position. If desired, a damped spring may be used so that the wiper is slowly returned to its center position. In other embodiments of the invention stops may be provided for momentarily holding the upper section 282 of control knob 32 at the position to which it is rotated and then releasing this upper section to permit it to return to its rest position. In both cases the purpose is to allow sufficient time for the circuit or person to whom the information is supplied to utilize this information.

What is claimed is:

1. An electromechanical arrangement comprising, in combination, supporting means; a control member movably mounted on said supporting means and movable from a reference position to other positions; first translation means coupled to said control member for translating its position into a pair of voltages indicative of the carstesian coordinates in a given plane of said position; and second translation means coupled to said control member for translating its position into a voltage in the polar form R sin $\theta$, where R is a parameter indicative of the extent of displacement of said position from said rest position, and $\theta$ is a parameter indicative of the angle of displacement of said position from said rest position, both of the foregoing parameters being taken with respect to said given plane.

2. A mechanical movement comprising, in combination, supporting means; a control member movably mounted on said supporting means, said control member having a rest position and being displaceable from said rest position to other positions at different angles from a reference line extending through said rest position; a rotatable member; means coupled to said rotatable member and to said control member for rotating said rotatable member through an angle proportional to the angular displacement from said reference line of said control member; control means responsive to movement of said control member through its rest position for rotating said rotatable member a substantial angle out of correspondence with the angular position of said control member during the time the latter passes through its rest position and means for translating the position of said rotatable member to a voltage having a parameter proportional to the extent of its rotation from a predetermined position.

3. A mechanical movement as set forth in claim 2, in which said means for translating the position of said control member translates said position into a voltage in the form R sin $\theta$, where R is proportional to the extent of displacement of said control member from its rest position, and $\theta$ is proportional to the angle of said displacement relative to said reference line.

4. In combination, supporting means, a control member movably mounted on said supporting means, said control member having a rest position and being displaceable from said rest position to other positions at different angles from a reference line originating at said rest position and extending therefrom; electromechanical means for translating the position of said control member into a pair of voltages proportional to the cartesian coordinates in a given plane of said position, referred to said rest position; mechanical means for translating the angular displacement in said given plane, relative to said reference line, of said control member, to a mechanical rotation through an angle, relative to a reference position, which is proportional to said angular displacement; and circuit means for deriving from said pair of voltages and said mechanical rotation a resultant alternating voltage in the form R sin $\theta$, where R is a term of magnitude and is proportional to the extent of displacement in said given plane of the control member from its rest position, and $\theta$ is a term of phase and is proportional to the angle of said displacement in said given plane relative to said reference line.

5. In the combination as set forth in claim 4, said pair of voltages being alternating voltages, and said means for deriving an alternating voltage in the form R sin θ comprising a two-phase resolver including a pair of stator windings and a rotor winding, one of said stator windings being connected to receive one of said pair of voltages, and the other of said stator windings being connected to receive the other of said pair of voltages, and said rotor being mechanically coupled to said mechanical means, whereby it is rotated by the latter through an angle which is proportional to said angular displacement of said control member.

6. In the combination as set forth in claim 4, further including means responsive to movement of said control member through its rest position for translating said movement to a mechanical rotation of said mechanical means through an angle which is substantially out of correspondence with the actual angular displacement of said control member during its passage through said rest position.

7. In combination, supporting means; a rotatable member rotatably mounted on said supporting means; slideable carriage means mounted on said rotatable member for movement along a single line of travel on a surface of said rotatable member, said surface being perpendicular to the axis of rotation of said rotatable member; a control member coupled to said slideable carriage, said control member having a predetermined rest position; and electromechanical means responsive to force applied to said control member for rotating said rotatable member to a position such that said single line is aligned with the direction of application of said force.

8. In the combination as set forth in claim 7, further including a pair of other members; mechanical means coupled to said control member and responsive to linear movement thereof for resolving said movement into equivalent cartesian coordinate movements of said pair of other members.

9. In the combination as set forth in claim 8, further including circuit means operatively associated with said pair of other members and said rotatable member for translating the movements of said three members into a voltage in the form R sin θ, where R is a term of magnitude and is proportional to the extent of the linear movement of said control member, and θ is a term of phase and is proportional to the angle of said movement relative to a given reference line.

10. An electromechanical arrangement comprising, in combination, supporting means; a control member movably mounted on said supporting means and movable from a reference position to other positions; first translation means coupled to said control member for translating its instantaneous position into a pair of voltages indicative of the cartesian coordinates in a given plane of said instantaneous position; and second translation means coupled to said control member for providing a voltage indicative of the velocity of movement of said control member.

11. An electromechanical arrangement comprising, in combination, supporting means; a control member movably mounted on said supporting means and movable from a reference position to other positions displaced from said reference position amounts indicative of the displacement of remote objects from a reference position; first translation means coupled to said control member for translating its instantaneous position into a pair of voltages indicative of the cartesian coordinates in a given plane of a remote object; and second translation means coupled to said control member for providing a voltage indicative of the cartesian coordinate in a second plane perpendicular to said first plane of a remote object.

12. An electromechanical arrangement as set forth in claim 11, wherein said second translation means includes a source providing an output voltage, and control means on said control member for adjusting a parameter of said output voltage.

13. An electromechanical arrangement as set forth in claim 11, wherein said second translation means includes a potentiometer; a source of voltage connected across said potentiometer; and mechanical means located on said control member and coupled to said potentiometer for adjusting the amount of voltage tapped from said potentiometer.

14. In combination, supporting means; a rotatable member rotatably mounted on said supporting means; slideable carriage means mounted on said rotatable member for movement along a single line of travel on a surface of said rotatable member, said surface being perpendicular to the axis of rotation of said rotatable member; a control member coupled to said slideable carriage, said control member having a predetermined rest position; and means responsive to force applied to said control member for rotating said rotatable member to a position such that said single line is aligned with the direction of application of said force.

15. In combination, supporting means; a control member movably mounted on said supporting means and manually movable from a reference position to other positions; first translation means coupled to said control member for translating its instantaneous position into a pair of voltages indicative of the coordinates in a given plane of a position; and second translation means coupled to said control member for providing a voltage indicative of a third coordinate of a position.

16. In combination, supporting means; a control member movably mounted on said supporting means and manually movable from a reference position to other positions; first translation means coupled to said control member for translating its instantaneous position into a pair of voltages indicative of the coordinates in a given plane of a position; and second translation means including means for rotating at least a portion of said control member about an axis for producing a voltage having a parameter proportional to the extent of said rotation.

17. In combination, supporting means; a control member movably mounted on said supporting means and manually movable from a reference position to other positions; first translation means coupled to said control member for translating its instantaneous position into a pair of voltages indicative of two cordinates of the position of a remote object; and second translation means coupled to said control member for providing a voltage indicative of the velocity of said remote object.

18. In combination, supporting means; a control member movably mounted on said supporting means and manually movable from a reference position to other positions; first translation means coupled to said control member for translating its instantaneous position into a pair of voltages indicative of two parameters of a remote object; and second translation means operatively related to said control member for providing a voltage indicative of a third parameter of said remote object.

References Cited in the file of this patent

UNITED STATES PATENTS

| | | |
|---|---|---|
| 2,455,963 | Wheeler | Dec. 14, 1948 |
| 2,510,384 | Dehmel | June 6, 1950 |
| 2,511,614 | Agins | June 13, 1950 |
| 2,594,887 | Earls | Apr. 29, 1952 |
| 2,623,714 | Slater | Dec. 30, 1952 |
| 2,682,045 | Crost | June 22, 1954 |
| 2,740,962 | Hammond | Apr. 3, 1956 |
| 2,877,457 | Gimpel | Mar. 10, 1959 |